Figures 1, 2:
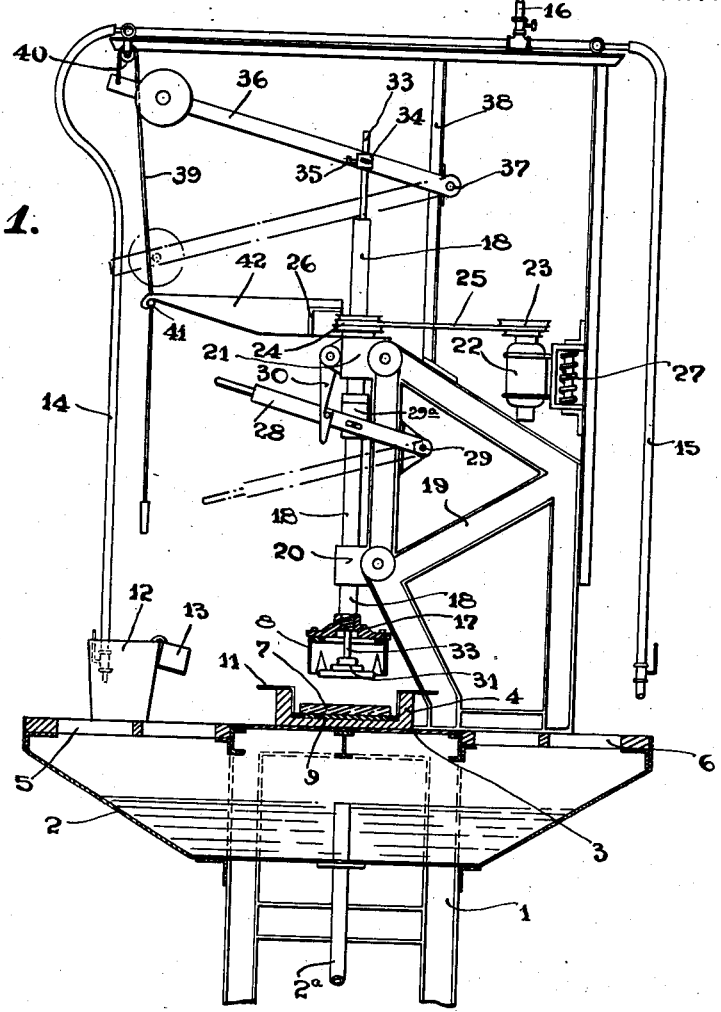

Jan. 22, 1935.  C. BROWN  1,988,538
APPARATUS FOR CUTTING DISKS
Filed Sept. 1, 1933  2 Sheets-Sheet 1

INVENTOR
CHRISTOPHER BROWN.
BY
Bradley + Bee
ATTORNEYS.

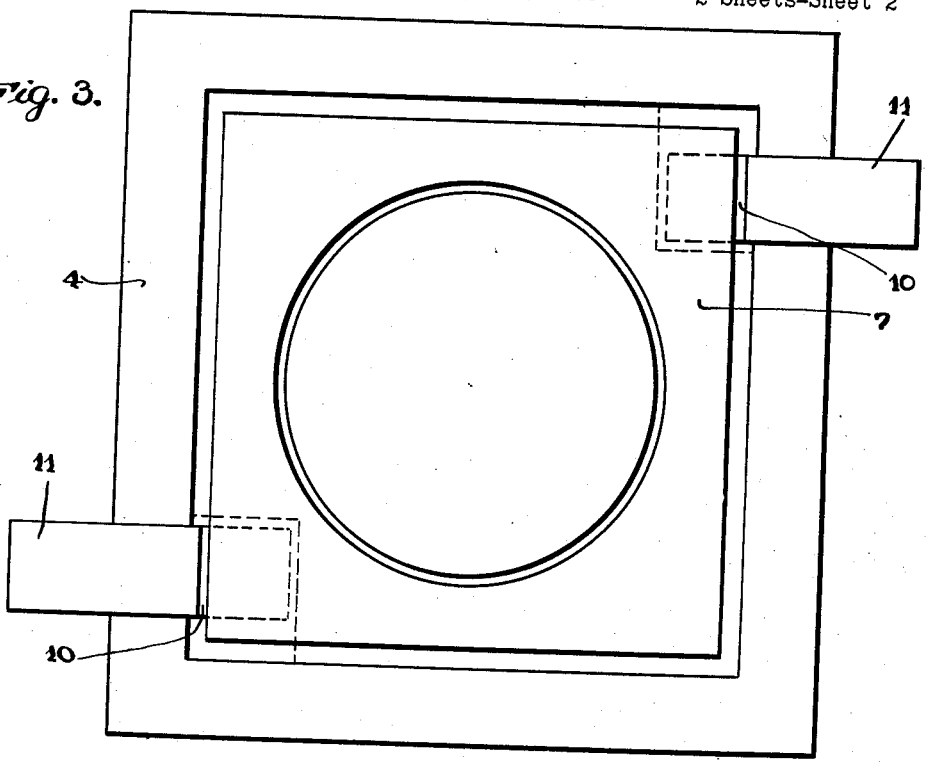
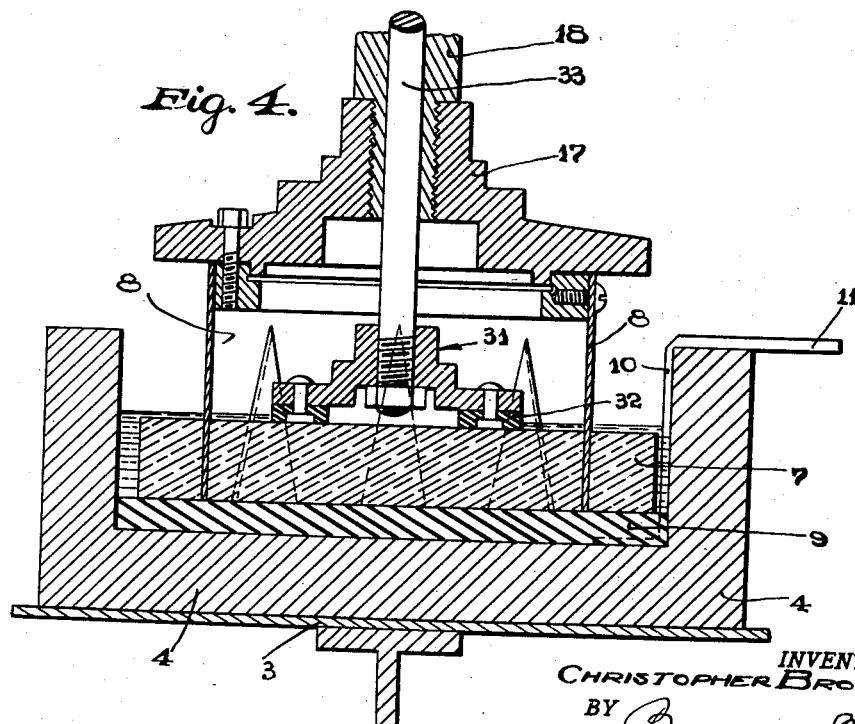

Patented Jan. 22, 1935

1,988,538

UNITED STATES PATENT OFFICE 1,988,538

APPARATUS FOR CUTTING DISKS

Christopher Brown, Ford City, Pa., assignor to Pittsburgh Plate Glass Company, a corporation of Pennsylvania Application September 1, 1933, Serial No. 687,918

2 Claims. (Cl. 125—20)

The invention relates to apparatus for cutting out disks from hard material. The apparatus is designed particularly for cutting disks of plate glass for port lights, but is not limited to use with this material, and may be used for cutting disks from plates of marble, stone, Carrara glass, or other hard materials requiring the use of an abrasive to secure a cutting action of the annular drill employed. The objects of the invention are the provision of improved means for supporting and holding the plates to be cut, so that the squares from which the disks are cut may be of a minimum size with the use of a minimum amount of abrasive, and the provision of a supporting and holding means to which the squares may be applied and removed quickly and easily by the operator. One embodiment of the invention is shown in the accompanying drawings, wherein:

Figure 1 is a side elevation, partly in section, of the apparatus. Fig. 2 is a plan view of the lower portion of the apparatus with the drill frame and parts carried thereby removed. Fig. 3 is an enlarged detail plan view. And Fig. 4 is an enlarged detail sectional view.

Referring to the drawings, 1 is a supporting framework for the table, which also carries a drain pan 2 for the water and abrasive used in the cutting operation, such pan having a suitable overflow pipe 2a. The table comprises a central section 3, which supports the box 4 for carrying the plate to be cut and the side sections 5, and 6 (Fig. 2), which are formed of slats with spaces therebetween to facilitate dumping the used mixture of abrasive and water from the boxes into the drain pan.

The box 4 is freely movable on the table, and carries the square plate 7 of glass or other material from which a disk is to be cut by the annular drill 8. The box may be of any suitable material, such as wood, and carries on its bottom a removable plate 9, preferably of rubber, on which the glass plate rests giving a secure, but yielding support during the cutting operation. In order to provide for the removal of the glass after the cutting operation, the corners of the rubber plate are provided with fingers 10, 10 whose lower ends turn under the plate in suitable recesses therein, and whose upper ends 11 turn outward forming lifting handles. Seated on the table beside the box is a pail 12 provided with a dipper 13, and carrying a mixture of abrasive and water for use in the box. Water for this pail and for washing the box and glass after each operation, is supplied from the overhead pipes 14 and 15 provided with water valves and connected to the supply main 16. In operation a box is loaded on the side table section 5 (Fig. 2) while a cutting operation is in progress, and after such operation the box in the center section or table 3, is moved laterally onto the side table section 6 and the box on the table section 5 pushed into position on the table section 3, thus reducing the loss of time in operating the machine to a minimum.

The toothed annular drill 8 is secured to a head 17 carried on a hollow spindle 18 mounted in a suitable framework 19 carried by the framework 1. The spindle is mounted for vertical movement through a pair of bearings 20 and 21, and is driven by the motor 22 through the intermediary of the pulleys 23 and 24 and the belt 25, the pulley 24 being splined on the spindle 18, and held in a suitable bracket 26 carried by the bearing 21. The motor is carried by a suitable spring take-up mounting 27 for keeping the belt tensioned. The weight of the spindle 18 and the head 17 provides the necessary force for feeding the drill downwardly during the cutting operation, and a reverse movement to withdraw the spindle is provided for by the handle 28, pivoted at 29, and having a pin and slot connection with a swivel 29a on the spindle. The handle is held in upper position by the latch 30 pivoted to the bearing 21.

The glass 7 is clamped against the rubber plate 9 in the bottom of the box 4 by the head 31, the pressure thus applied also clamping the box 4 against the table 3. The head is faced with a disk 32 of rubber or felt, and is carried by a rod 33, which extends upward through the hollow spindle 18 and is provided at its upper end with a pivot block 34 clamped to the rod by a set screw 35. Clamping force is applied to the rod by the weighted lever 36 pivoted at 37 to a brace 38 carried by the framework 19, the lever also being suitably pivoted to the block 34. The lever 31 is held in its upper or release position, as shown in Fig. 1, by the cable 39 passing over the sheave 40 and provided with a hook 41 engaged by an arm 42 carried by the bracket 26.

In operating the machine, the parts are positioned as indicated in Fig. 1, and the box 4 supplied with a mixture of abrasive and water. The hook 41 is then released permitting the lever 36 to move the head 31 down into engagement with the glass, thus clamping it firmly against the bottom of the box, and clamping the box against the table. The handle 28 is next released from its latch 30, so that the spindle moves down and the cutter 8 engages the glass, the motor being at this time in operation, so that the cutting operation commences. After the cutting operation, the parts are returned to the position shown in Fig. 1 by means of the handle 28 and cable 39 and the box is slid laterally onto the table 6 and its contents removed by the fingers 10. The water and abrasive in the box is then dumped in the pan 2 and washed. As soon as the box 4 is moved from the table 3, another box carrying a plate for cutting is slid into position from the table 5, and another cutting operation started.

What I claim is:

1. Apparatus for cutting disks from flat rectangular plates, comprising a box for supporting the plate to be cut and carrying the supply of abrasive and water required, a removable rubber plate fitting in the box on the bottom thereof, means engaging said removable plate and extending up along the inner sides of the box to the upper edge thereof for moving it upward through the box after the cutting operation, a head carried by a vertically movable hollow spindle positioned in opposition to the box, and provided with an annular drill, means for rotating the spindle, a clamping rod extending slidably through the spindle and provided at its lower end with means for engaging the plate to be cut and forcing it against the bottom of the box and means for applying downward pressure to the rod.

2. Apparatus for cutting disks from flat rectangular plates, comprising a box for supporting the plate to be cut and carrying the supply of abrasive and water required, a removable plate fitting in the box on the bottom thereof, fingers attached to the removable plate extending up along the sides of the box and provided at the upper edge of the box with handles whereby the plate may be readily removed from the box after the cutting operation, a head carried by a vertically movable hollow spindle positioned in opposition to the box, and provided with an annular drill, means for rotating the spindle, a clamping rod extending slidably through the spindle and provided at its lower end with means for engaging the plate to be cut and forcing it against the bottom of the box, and means for applying downward pressure to the rod.

CHRISTOPHER BROWN.